United States Patent
Strogov et al.

(10) Patent No.: US 11,611,586 B2
(45) Date of Patent: *Mar. 21, 2023

(54) SYSTEMS AND METHODS FOR DETECTING A SUSPICIOUS PROCESS IN AN OPERATING SYSTEM ENVIRONMENT USING A FILE HONEYPOTS

(71) Applicant: Acronis International GmbH, Schaffhausen (CH)

(72) Inventors: Vladimir Strogov, Moscow (RU); Alexey Dod, Moscow (RU); Alexey Kostyushko, Moscow (RU); Valeriy Chernyakovsky, Moscow (RU); Serguei Beloussov, Costa del Sol (SG); Sergey Ulasen, Moscow (RU); Stanislav Protasov, Moscow (RU)

(73) Assignee: Acronis International GmbH, Schaffhausen (CH)

( * ) Notice: Subject to any disclaimer, the term of this patent is extended or adjusted under 35 U.S.C. 154(b) by 187 days.

This patent is subject to a terminal disclaimer.

(21) Appl. No.: 17/164,902

(22) Filed: Feb. 2, 2021

(65) Prior Publication Data

US 2021/0160284 A1    May 27, 2021

Related U.S. Application Data

(63) Continuation of application No. 16/132,639, filed on Sep. 17, 2018, now Pat. No. 10,938,854.
(Continued)

(51) Int. Cl.
*H04L 9/40* (2022.01)
*G06N 20/00* (2019.01)
(Continued)

(52) U.S. Cl.
CPC ........ *H04L 63/1491* (2013.01); *G06F 21/554* (2013.01); *G06N 20/00* (2019.01);
(Continued)

(58) Field of Classification Search
CPC ............ H04L 63/1491; H04L 63/0245; H04L 63/1416; H04L 63/1433; H04L 63/101;
(Continued)

(56) References Cited

U.S. PATENT DOCUMENTS

| | | | |
|---|---|---|---|
| 9,027,135 B1 * | 5/2015 | Aziz | H04L 63/1491 726/23 |
| 10,938,854 B2 * | 3/2021 | Strogov | H04L 63/1416 |
| 11,032,319 B1 * | 6/2021 | Roundy | G06F 21/62 |

(Continued)

FOREIGN PATENT DOCUMENTS

| | | | | |
|---|---|---|---|---|
| CN | 114342319 A | * | 4/2022 | ......... H04L 63/0263 |
| WO | WO-2007110105 A1 | * | 10/2007 | ........... H04L 12/585 |
| WO | WO-2012135192 A2 | * | 10/2012 | .............. G06F 11/00 |

*Primary Examiner* — Sarah Su
(74) *Attorney, Agent, or Firm* — ArentFox Schiff LLP; Michael Fainberg (57) ABSTRACT

A system and method is provided for detecting a suspicious process in an operating system environment. In an exemplary aspect, a method comprises generating, by a hardware processor, a file honeypot in a directory in a file system and receiving a directory enumeration request from a process executing in the operating system environment. The method comprises determining whether the process is identified in a list of trusted processes and in response to determining that the process is not in the list of trusted processes, providing, to the process by the file system, a file list including the file honeypot responsive to the directory enumeration request. The method further comprises intercepting, by a file system filter driver, a file modification request for the file honeypot from the process, and identifying the process as a suspicious object responsive to intercepting the file modification request from the process.

19 Claims, 4 Drawing Sheets

Related U.S. Application Data (60) Provisional application No. 62/561,725, filed on Sep. 22, 2017.

(51) Int. Cl.
    *H04L 67/1097*    (2022.01)
    *G06F 21/55*    (2013.01)

(52) U.S. Cl.
    CPC ...... *H04L 63/0245* (2013.01); *H04L 63/1416* (2013.01); *H04L 63/1433* (2013.01); *H04L 67/1097* (2013.01)

(58) Field of Classification Search
    CPC .............. H04L 63/145; H04L 67/1097; G06N 20/00; G06F 21/554
    See application file for complete search history.

(56) References Cited

U.S. PATENT DOCUMENTS

| | | | |
|---|---|---|---|
| 2009/0144823 A1‡ | 6/2009 | Lamastra | H04W 12/1208 726/22 |
| 2014/0359729 A1‡ | 12/2014 | Kreiner | G06F 21/51 726/5 |
| 2016/0359695 A1‡ | 12/2016 | Yadav | G06N 20/00 |
| 2017/0308711 A1‡ | 10/2017 | Barak | G06F 21/566 |
| 2017/0324755 A1‡ | 11/2017 | Dekel | G06F 21/60 |
| 2017/0366563 A1‡ | 12/2017 | Volfman | H04L 63/1491 |
| 2018/0032726 A1‡ | 2/2018 | Parinov | G06F 21/56 |
| 2018/0146009 A1‡ | 5/2018 | Primm | H04L 63/1491 |
| 2018/0324214 A1‡ | 11/2018 | Schoenherr | G06F 21/6209 |
| 2019/0081980 A1‡ | 3/2019 | Luo | H04W 12/1201 |
| 2019/0332766 A1‡ | 10/2019 | Guri | G06F 21/566 |
| 2020/0089876 A1‡ | 3/2020 | Aharoni | G06F 21/566 |
| 2021/0256117 A1* | 8/2021 | Aharoni | G06F 21/554 |

\* cited by examiner
‡ imported from a related application

SYSTEMS AND METHODS FOR DETECTING A SUSPICIOUS PROCESS IN AN OPERATING SYSTEM ENVIRONMENT USING A FILE HONEYPOTS

CROSS-REFERENCE TO RELATED APPLICATIONS

The present application is a continuation of U.S. Non-Provisional application Ser. No. 16/132,639 and claims the benefit of priority of U.S. Provisional Application No. 62/561,725 filed on Sep. 22, 2017, which is herein incorporated by reference in its entirety.

FIELD OF TECHNOLOGY

The present disclosure relates generally to the field of computer security, more specifically, to systems and methods for protecting file data of a computer system from ransomware and other malicious programs using file honeypots.

BACKGROUND

Typically, an operating system of a computer system includes a file system to provide users access to data on the computer system's disk and to provide the shared use of files by several users and processes. Generally, the term "file system" (or "filesystem" interchangeably) encompasses the totality of all files on the disk and the sets of data structures used to manage files, such as, for example, file directories, file descriptors, free and used disk space allocation tables, and the like. Accordingly, end users generally regard the computer file system as being composed of files and a number of directories. Each file usually stores data and is associated with a symbolic name. Each directory may contain subdirectories, files or both. The files and directories are typically stored on a disk or similar storage device.

One issue that affects the operations of computer systems and file systems in particular is the prevalence of malicious software. Malicious software, also referred to as "malware," can infiltrate or damage a computer system by corrupting software code, resulting in abnormal operation or even termination of applications and the operating system. One type of malware known as "ransomware" takes block access to data on a computer system until a ransom is paid. Ransomware typically uses cryptography techniques to encrypt a computer system's files (such as a computer's Master File Table or the entire hard drive), thereby making them inaccessible until decrypted upon payment of the ransom. Ransomware can alter the file system in other ways, for example, by hiding the files, modifying the access rights of the files, moving the files to a hidden location in the file system, scrambling the names of files, or some combination thereof.

Known approaches for protecting a computer system against ransomware and other malware generally involve periodic data archiving and protection in case malicious programs are detected attempting to alter the file system. One of these approaches is a backup of the entire hard drive, which typically involves copying of the hard drive contents onto some other medium (such as another hard disk drive, a DVD ROM, a DVD RAM, a flash disk, etc.). Another approach is to proactively back up files or create file snapshots whenever a suspicious program attempts to make changes to user files.

However, these approaches have several drawbacks, including the high cost in time and resources of the user and the computer system on which they are applied. Creation of backup copies (or snapshots) of some or all files requires a significant amount of disk space to store the created copies, and creates a load on the computer system by consuming processor power and RAM, which ultimately leads to a decrease in productivity. In another approach, to save resources, security programs that monitor changes in files that can be produced by potential malicious software often check only the header of a file, but not all of its contents.

Thus, there is a need in the art for systems and methods that increase the effectiveness of protection against ransomware and other malware while minimizing the cost of such protection.

SUMMARY

Thus, a system and method is disclosed herein for detecting ransomware and malicious programs.

According to an exemplary aspect, a method is provided for detecting ransomware and malicious programs. The exemplary method comprises generating, by a hardware processor, a file honeypot in a directory in a filesystem, wherein the file honeypot is included on a file list of contents of the directory, receiving a directory enumeration request from a process executing in an operating system environment, determining whether the process is identified in a list of trusted processes based on one or more of a certificate, fingerprint, name, and process identifier, when the process is not found in the list of trusted processes, providing, by the filesystem, the file list including the file honeypot to the process responsive to receiving the directory enumeration request and otherwise, providing the file list excluding the file honeypot to the process, intercepting, by a filesystem filter driver, a file modification request for the file honeypot from the process and identifying the process as a suspicious object responsive to intercepting the file modification request from the process.

In one aspect of the method generating the file honeypot further comprises at least one of creating a special file corresponding to the file honeypot in the directory, and updating the file list to add a filename of the special file at a first position of the file list.

In another aspect of the method, generating the file honeypot further comprises adding a filename of a nonexistent file to the file list associated with the directory.

In another aspect, the method further comprises assigning to the generated file honeypot a filename having at least one steganographic element.

In another aspect, the method further comprises modifying a file attribute of the generated file honeypot to indicate a hidden file.

In another aspect of the method, generating the file honeypot further comprises generating the file honeypot according to a template that specifies a document type and one or more file naming rules comprising at least one steganographic element.

In another aspect, the method further comprises responsive to receiving the directory enumeration request, performing a machine learning analysis on a stack trace of the directory enumeration request using machine learning and adding a file honey pot to the provided file list responsive to the directory enumeration request based on the machine learning analysis.

An exemplary system according to the aspects of the disclosure includes a storage device having a filesystem and a hardware processor configured to generate a file honeypot in a directory in the filesystem, wherein the file honeypot is included on a file list of contents of the directory, receive a directory enumeration request from a process executing in an operating system environment, determine whether the process is identified in a list of trusted processes based on one or more of a certificate, fingerprint, name, and process identifier, when the process is not found in the list of trusted processes, provide, by the filesystem, the file list including the file honeypot to the process responsive to receiving the directory enumeration request and otherwise, providing the file list excluding the file honeypot to the process, intercept, by a filesystem filter driver, a file modification request for the file honeypot from the process; and identify the process as a suspicious object responsive to intercepting the file modification request from the process.

An exemplary computer-readable medium according to the aspects of the disclosure include instructions that comprise generating a file honeypot in a directory in a filesystem, wherein the file honeypot is included on a file list of contents of the directory, receiving a directory enumeration request from a process executing in an operating system environment, determining whether the process is identified in a list of trusted processes based on one or more of a certificate, fingerprint, name, and process identifier, when the process is not found in the list of trusted processes, providing, by the filesystem, the file list including the file honeypot to the process responsive to receiving the directory enumeration request and otherwise, providing the file list excluding the file honeypot to the process, intercepting, by a filesystem filter driver, a file modification request for the file honeypot from the process and identifying the process as a suspicious object responsive to intercepting the file modification request from the process.

The above-simplified summary of example aspects serves to provide a basic understanding of the disclosure. This summary is not an extensive overview of all contemplated aspects, and is intended to neither identify key or critical elements of all aspects nor delineate the scope of any or all aspects of the disclosure. Its sole purpose is to present one or more aspects in a simplified form as a prelude to the more detailed description of the detailed description that follows. To the accomplishment of the foregoing, the one or more aspects of the disclosure include the features described and particularly pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method and computer program product for detecting ransomware and malicious programs. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Certain aspects of the present disclosure provide a system and method that use the technology of creating and implementing special "file honeypots" designed to identify malicious programs before such programs damage real user data or files. The described system is based on the creation in the system of special "virtual" files in a place within the filesystem (e.g., folder, directory) where the files are potentially detected by ransomware. The virtual files (also referred to herein as file honeypots) may act as decoy files or "canary" files, the modification of which signals to the system the possible presence of malicious software. The virtual files can be generated by a special template, which includes the document types and rules for naming such files (including elements that are concealed within the file, i.e., steganographic elements). Additionally, these files can be hidden so that the user and standard applications cannot see them.

Figure 1:
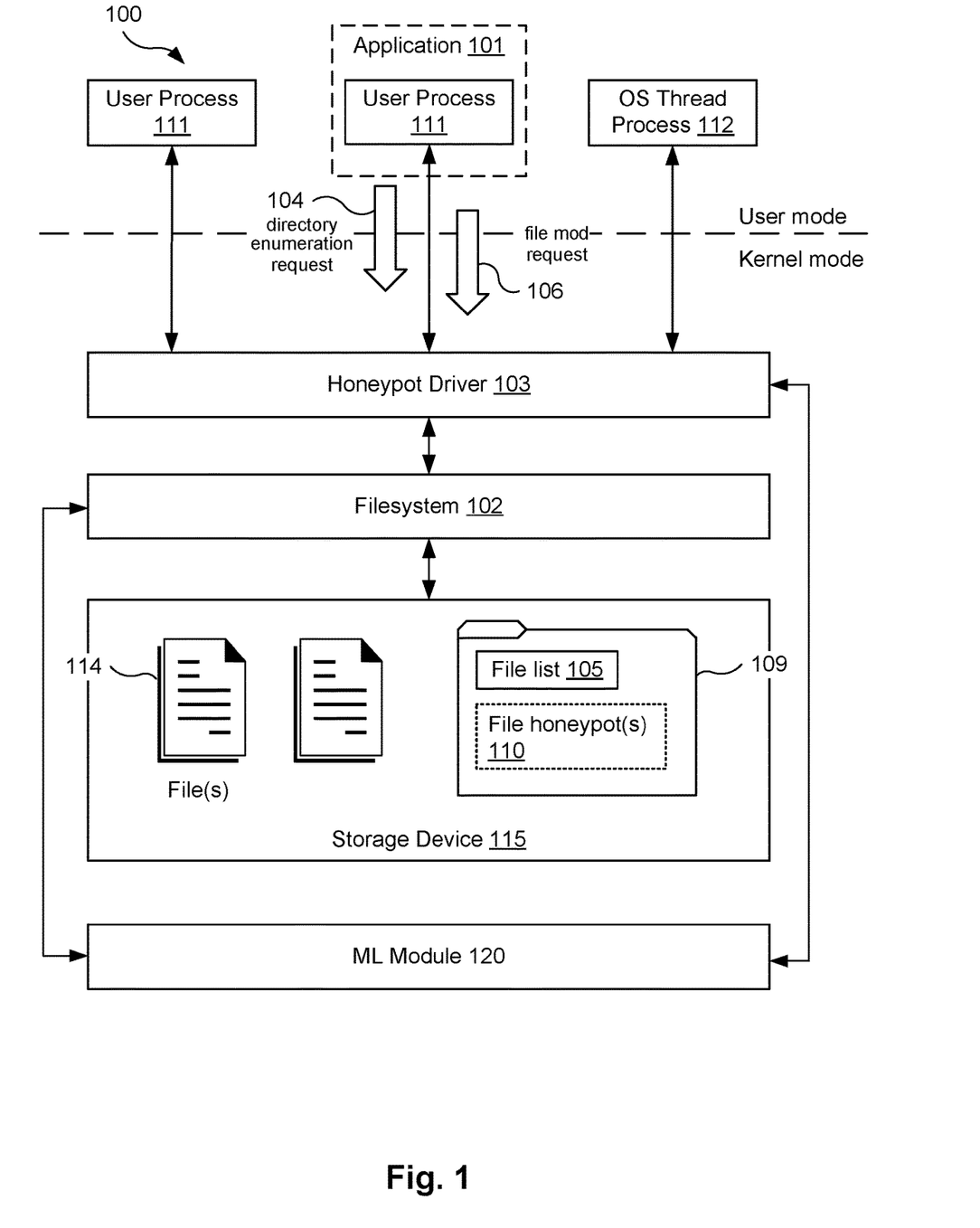
FIG. 1 is a block diagram illustrating a system for detecting ransomware and malicious programs according to an exemplary aspect.

FIG. 1 is a block diagram illustrating a system 100 for detecting ransomware and malicious programs according to an exemplary aspect. The system 100 includes one or more storage devices 115 storing a plurality of files 114. The system 100 supports execution of one or more user processes 111 executing in an operating system (OS) environment provided by an operating system (not shown). The system further supports execution of one or more OS thread processes 112 in parallel with the user processes. The user processes 111 and OS thread processes 112 may access the files 114 via a filesystem layer 102 provided by the operating system. For example, user processes 111 and OS thread processes 112 may request to read and write data to the storage device 115 via a filesystem request. For simplicity of explanation, a filesystem and a filesystem driver that implements the filesystem are interchangeably referred to as filesystem 102.

One of the user processes 111 (or OS threads 112) may be instances of malicious software or application 101 that blocks access to the files 114 using cryptography. This is depicted in FIG. 1 by a dashed outline of a user process 111. For example, such malicious software or malware may generate a random encryption key and encrypts the files 114 with it.

According to one aspect, the system 100 includes a honeypot driver 103 configured to create one or more file honeypots 110 in the storage device 115. In some aspects, the honeypot driver 103 may be arranged in an information workflow between the filesystem 102 and applications running in user mode (e.g., application 101), such that the honeypot driver 103 may intercept requests from applications prior to being handled by the filesystem 102. In this aspect, an information workflow refers to the sequence and details of specific file system operations, performed by application(s), e.g. application 101. In some aspects, the honeypot driver 103 may be implemented as a filesystem filter driver. Filesystem filter drivers are kernel-mode components that run as part of the operating system. Filesystem filter drivers are configured to extend functionality of or modify the behavior of a filesystem 102. A filesystem filter driver can filter I/O operations for one or more filesystems or filesystem volumes. An I/O operation in a file request can be processed by different filesystem filter drivers in a particular sequence, i.e., in an order defined by the storage stack of the operating system. In some exemplary aspects, the honeypot driver 103 may be attached to one or more mounted volumes of the storage device 115 that has been designated (e.g., by an administrator) for protection from malware and ransomware, and filters all I/O operations on them.

The honeypot driver 103 may create one or more file honeypots 110 within a directory 109 on the filesystem, and add the file honeypots 110 to a file list 105 for the directory 109. Each of the file honeypots 110 act as decoy files that facilitate the system 100 with identifying which of the user processes 111 might be malware that maliciously modifies the users' files in the storage device 115. File honeypots 110 may be virtual or physical. In one implementation, the honeypot driver 103 may create the file honeypots as special files and add them to the file list 105. Such files may be "empty" files, or may have specially-generated content. In an alternative aspect, the files may not be created at all, and the file honeypots are implemented as names of nonexistent files added to the file list 105. For example, the honeypot driver 103 may read the file list 105, add several names that are randomly, or non-randomly generated to the list 105, and then return the amended file list 105. In other aspects, the file honeypots 110 may be references (e.g., reparse files, soft links) to files located elsewhere. In such aspects, the file honeypots 110 are implemented as a pair of file. One file is the generated physical file as the actual honeypot content holder, and is stored in a special location on the storage device 115. The other file is the nonexistent file, added to the file list or the physical file in the directory. The nonexistent file acts as a redirection file that is used for reparsing the file open operation to the physical honeypot content holder.

The file honeypots 110 are generally configured to discourage access by normal (e.g., non-malicious) processes or in common operations of the system 100. In some aspects, the file honeypots 110 may receive a file attribute of hidden files (e.g., by setting a hidden flag to be true), so that neither the user nor other applications can see them and do not make random modifications to the files. In some aspects, the filenames of such files can include steganographic elements that distinguish the file honeypots from other files for human recognition. The file honeypots may be given a filename that is human-readable (i.e., easy to recognize by a human), but the computer program perceives as a nonsensical symbols. For example, one file honeypot 110 may be assigned a filename "$$$$A%%C##R@0N^^^!45$", which contains the characters "A", "C", "R", "0", "N", "!", "$" that is human-readable as the name "Acronis" but perceived as random characters by a computer program (e.g., application 101). In another example, a file honeypot 110 may be assigned a filename "_H&&0N&&&E*!Y)) P&&0%%T", which contains the characters "H", "0", "N", "E", "Y", "P", "0", "T" that is human-readable as the label "honeypot." In other words, the honeypot file is assigned a name that is perceived as random by malware, but is human-readable.

In one aspect, the plurality of file honeypots 110 may be stored in different locations (e.g., different directories, volumes). If the honeypot driver 103 detects a suspicious process accessing the several file honeypots, the honeypot driver 103 may determine that the process is likely malware. For example, if a program accesses several file honeypots which are stored in different user profile directories (e.g., C:\Windows\User1\ and C:\Windows\User2), the honeypot driver may conclude that there is a high likelihood that this program is malware or ransomware. In some aspects, the honeypot driver 103 concludes that a program is malware or ransomware when equal to or greater than a threshold number of files have been accessed, or attempted to access.

During operation, the application 101 accesses the directory 109 on the filesystem 102 and requests a list of files contained in the directory, for example using a directory enumeration request 104. The filesystem 102 passes the file list 105 to this application 101, which contains nonexistent or specially created files. If, after that, the application 101 makes a request for any modification of the files (e.g., via a file modification request 106), the honeypot driver 103 intercepts the request and places this application 101 on a list of unreliable software (e.g., black list). This action may be performed because the honeypot driver 103 concludes that no applications but malware or ransomware would attempt to perform any operations (other than reading) on the file honeypots. In some examples, a false positive may be received indicating that a particular software is untrusted and may be malware, whereas the software does in fact modify all files in a particular directory during normal execution. In this example, according to one aspect a whitelist is provided to allow software that is known to be non-malicious to execute. In another aspect, entropy calculations may be performed for the input and output of software which modifies or accesses all files in a particular directory, thus eliminating false positives.

According to one aspect, the filesystem 102 and honeypot driver 103 may employ a trained machine learning model generated by a machine learning (ML) module 120 for analyzing directory enumeration requests and determining whether to use file honeypots. The machine learning model may be configured to classify call stack traces (e.g., a stack trace of all method calls executed by software or for a particular function) corresponding to directory enumeration. The use of the machine learning model(s) allow the honeypots to be applied to those requests for which there is no clear information in the form of a digital signature or an already detected injection, but rather, based on the machine-learning model for such storage stacks. In this aspect, the textual representation of the call stack traces (e.g., method names, parameters and the like) are used to train machine-learning models to better recognize malware based on their directory enumeration requests.

Figure 2:
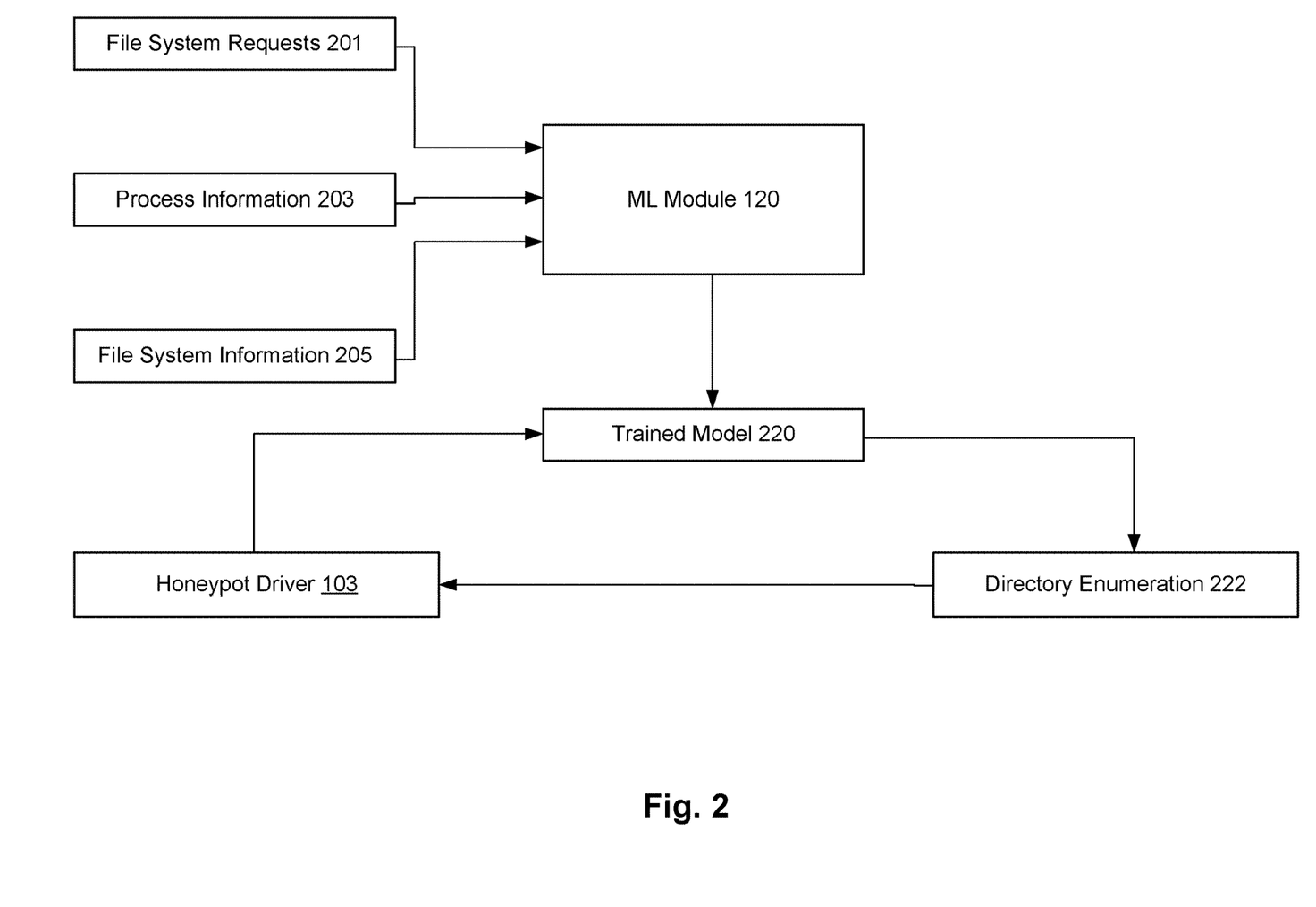
FIG. 2 is a flowchart illustrating a method for detecting ransomware and malicious programs according to an exemplary aspect.

FIG. 2 is a block diagram illustrating the ML module 120 in accordance with exemplary aspects of the disclosure.

The ML Module 120 observes various aspects of the activity occurring on storage device 115, memory and by processes in the user mode and kernel mode of system 100.

According to one aspect, the ML module 120 may determine whether honeypots are included in response to a directory enumeration request. For example, the ML module 120 shown in FIG. 2 observes all file system requests 201 to the system 100, process information 203 related to processes executing on system 100 and file system information 205 related to the storage device 115. Based on this collected information, the ML module 120 continuously improves the trained model 220.

Over time, the trained model 220 is able to better predict which processes are legitimate requests for file enumeration, based on their names, signatures, sources, authors, and the like. The trained model 220 may also be able to better predict which types of storage devices and files are prone to ransomware or malicious programs. Furthermore, the trained model 220 may also predict which types of file system requests may be from malicious processes or ransomware based on the frequency of requests, the particular directories or files requested, a time of day or week of the requests, or the like.

Ultimately, the honeypot driver 103 consults the trained model 220 to determine whether or what type of directory enumeration 222 to present to the requesting process. For example, the trained model 220 may indicate that the process (or file system or request) is not very suspicious, but is not entirely suspicion free, and may add files to the directory as a honeypot, or may add non-existing files to the list of files as honeypots, depending on the configuration of the system 100. In some aspects the trained model 220 indicates that the honeypot driver 103 should not display any honeypots at all based on the comparison of the process information, request information and storage information.

In yet another aspect, the honeypot driver 103 may determine, using the trained model 220, the types of honeypots which are most effective given a particular type of process, storage information or request information, in identifying a process associated with ransomware or a malicious process.

Figure 3:
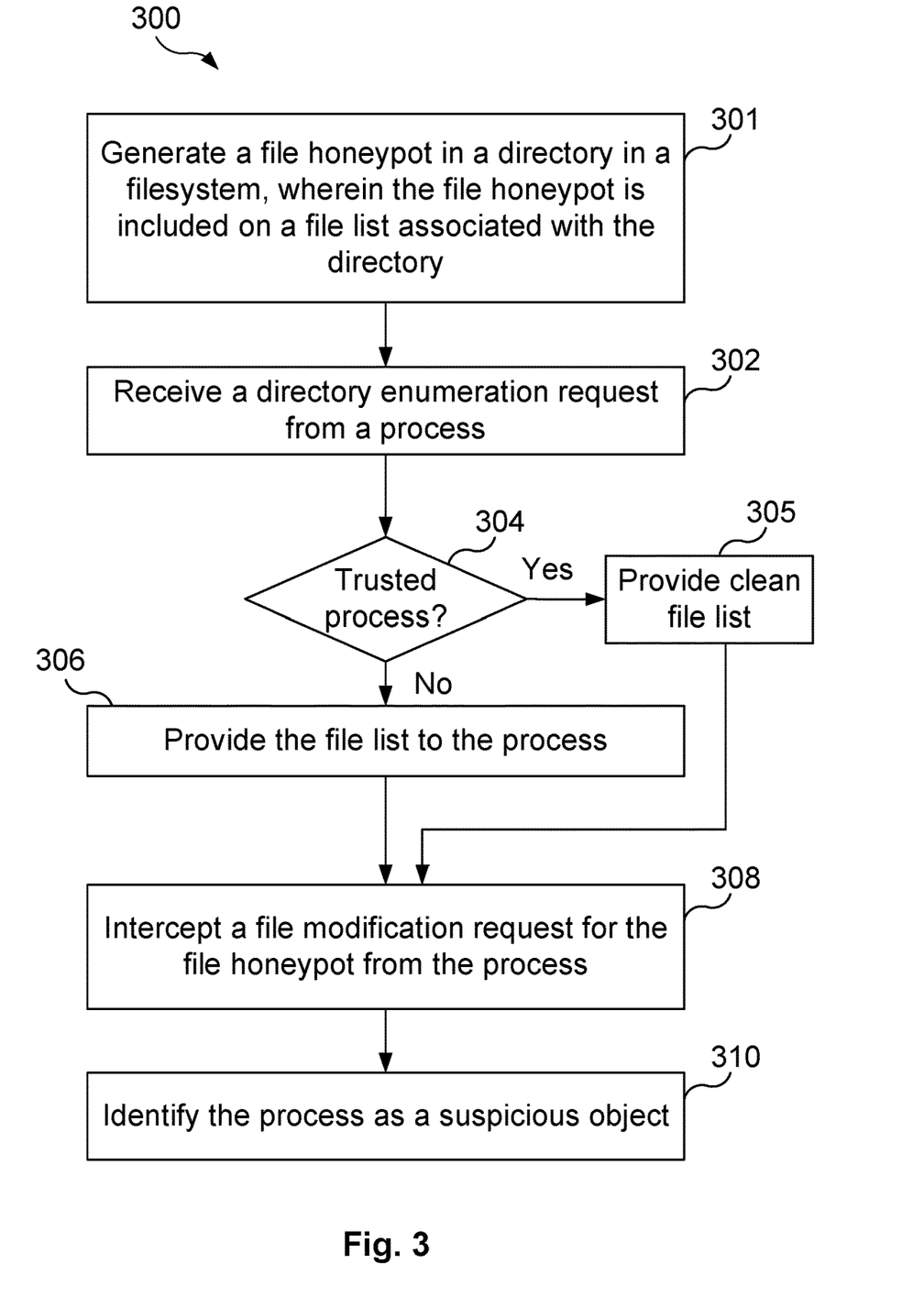
FIG. 3 is a block diagram of a general-purpose computer system on which the disclosed system and method can be implemented according to an exemplary aspect.

FIG. 3 is a flowchart illustrating a method 300 for detecting ransomware and malicious programs according to an exemplary aspect. It is noted that the following description of the exemplary method makes reference to the system and components described above.

The method 300 begins at step 301, in which the honeypot driver 103 generates one or more file honeypots 110 in a directory 109 in a filesystem. The file honeypot is included on a file list 105 associated with the directory 109. The honeypot driver 103 may create a new directory for this purpose, or may designate an existing directory. In some aspects, the honeypot driver 103 may generate a plurality of file honeypots in a plurality of locations within storage. In some aspects, the filesystem filter driver may create an empty file corresponding to the file honeypot in the directory, and then update the file list 105 to add a filename of the empty file. In other aspects, the honeypot driver 103 may add a filename of a nonexistent file to the file list associated with the directory. That is, the honeypot driver 103 adds a filename to the file list but refrains from creating a new file or allocating file data blocks within the storage device 115 to a file. For example, in implementations using the Windows operating system, the file system request IRP_MJ_DIRECTORY_CONTROL may be used to request for notifications of changes to the directory 109, and other analogous requests may be used in other platforms.

In some aspects, the honeypot driver 103 may add file honeypots at the first positions (e.g., a head or beginning) of the file list 105 associated with the directory, i.e., preceding "normal" files in the directory. This order of the file honeypots within the file list 105 is designed to present the decoys to malicious applications in this order to increase the likelihood that modifications attempts of file honeypots occur prior to attempts to modify the normal files. In some aspects, machine learning is incorporated by the system 100 to determine, based on a signature of the process requesting the enumeration, a placement order for the honeypots so that they are targeted directly in place of files that are not honeypots.

In some aspects, the honeypot driver 103 may assign to the generated file honeypot a filename having at least one steganographic element. In some aspects, the honeypot driver 103 may modify a file attribute of the generated file honeypot to indicate a hidden file. In some aspects, the filesystem filter driver may generate the file honeypot according to a template that specifies a document type and one or more file naming rules comprising at least one steganographic element.

At step 302, the filesystem 102 receives a directory enumeration request from a process (e.g., process 111) executing in an operating system environment. In some aspects, the honeypot driver 103 may be configured to use machine learning to analyze a stack trace of the intercepted directory enumeration request, the stack being the storage stack. For example, for the directory read request (e.g., IRP_MJ_DIRECTORY_CONTROL in Windows, or analogous requests in other systems) made by the process that is not a trusted process, the honeypot driver 103 may call a machine learning module to provide a verdict of maliciousness. If the machine learning module provides a verdict indicating that the storage call has anomalies, the decision can be made to add file honeypots to the file list 105. This helps minimize false positives in both file honeypot approaches and machine learning approaches by using the model response, based on the provided call stack trace, to help filter out trusted programs or processes.

At step 304, responsive to receiving the directory enumeration request, the filesystem 102 may check whether the process is on a list of trusted or safe applications, threads, and processes maintained by the filesystem 102 (e.g., a whitelist). In some aspects, attribution to such a list can be made by the filesystem 102 based on a digital signature certificate, fingerprint (e.g., hash value), name, process identifier, or other criteria such as size, details and results of static analysis (e.g., based on module sections, imported functions and the like).

Responsive to determining that the process issuing the directory enumeration request is a trusted process, at step 305, the filesystem 102 may provide a "clean" file list 105 absent the file honeypots to the process. That is, trusted or whitelisted processes are not exposed to or are made aware of the file honeypots. In some aspects, the filesystem 102 may modify the returned file list 105 to remove or mask out the file honeypots. In another aspect, the filesystem 102 may maintain a separate "clean" version of the file list 105 without the file honeypots contained therein and return that clean list to a process on the trusted list.

Otherwise, responsive to determining that the process issuing the directory enumeration request is not on the trusted list, at step 306, the filesystem 102 provides the file list 105 that includes the file honeypots to the untrusted process. In some aspects, the filesystem 102 may provide specific execution threads of the trusted processes with the file lists having the added file honey pots. In this aspect, malicious code may have created a remote thread in a trusted process. The remote thread may be detected by other known heuristics, but to verify the detection, aspects of the present disclosure adds file honeypots to the directory enumeration made by the aforementioned thread. In some aspects, the filesystem 102 may record or store information about the process that issued the directory enumeration request on that directory 109, such as a process identifier for the process 111 or an parent process identifier for the application 101.

At step 308, the honeypot driver 103 may intercept a file modification request for the file honeypot from the process. In some exemplary aspects, the file modification request may be a request to delete the "file" (i.e., the file honeypot), to overwrite certain blocks of the file with some provided data, to truncate the file, or to make other changes to the file. The file modification request may be indicated by a function code (e.g., IRP_MJ_WRITE in Windows OS, or other analogous requests under other operating systems such as Linux or macOS) representing a type of file operation that changes one or more data blocks of the file. In contrast, the honeypot driver 103 may treat any type of file access requests that do not modify the underlying file data as a read request. This includes both explicit requests to read data from storage, as well as requests to obtain metadata about a file or file handle. In some implementations, the type of a file access request can be identified based on an IRP function code or other metadata contained in the request 211 that represents a type of read operation (e.g., IRP_MJ_READ, IRP_MJ_QUERY_INFORMATION in Windows OS, or other analogous requests using other operating systems).

In some aspects, at step 310, the honeypot driver 103 may identify the process as a suspicious object responsive to intercepting the file modification request from the process. In some aspects, the honeypot driver 103 may identify the process as a malicious object based on the interception of the file modification request to a file honeypot. In some aspects, the honeypot driver 103 may add the process and its parent software application to a list of unreliable software. In subsequent operation, the honeypot driver 103 may intercept and prevent the execution of any subsequent file modification requests coming from that identified process. In other aspects, the filesystem filter driver or other security application may perform comprehensive security and malware analysis using the list of unreliable software to target specific software (e.g., process 111). In doing so, the described system 100 is able to more efficiently protect against ransomware and other malware compared to conventional approaches that would either perform comprehensive analysis on software unlikely to be malicious or perform cursory analysis (e.g., scanning only file headers of the software) on software.

In some aspects, the honeypot driver 103 may reach no conclusion regarding the process 111 and "fulfill" the file modification request on the file honeypot. In some aspects, the honeypot driver 103 can simulate the requested change to the file honeypot by returning a completed status confirmation to the process 111 while refraining from making any actual changes to the file honeypot 110. In one aspect, the honeypot driver 103 allows the requested change to the file honeypot to take place and the honeypot driver 103 (or another process) monitors the changes to the file over time. The honeypot driver 103 may then monitor the types of malware attracted to particular honeypots by observing the changes occurring to the file over time, because changes to honeypot files will not compromise the underlying computing device.

Figure 4:
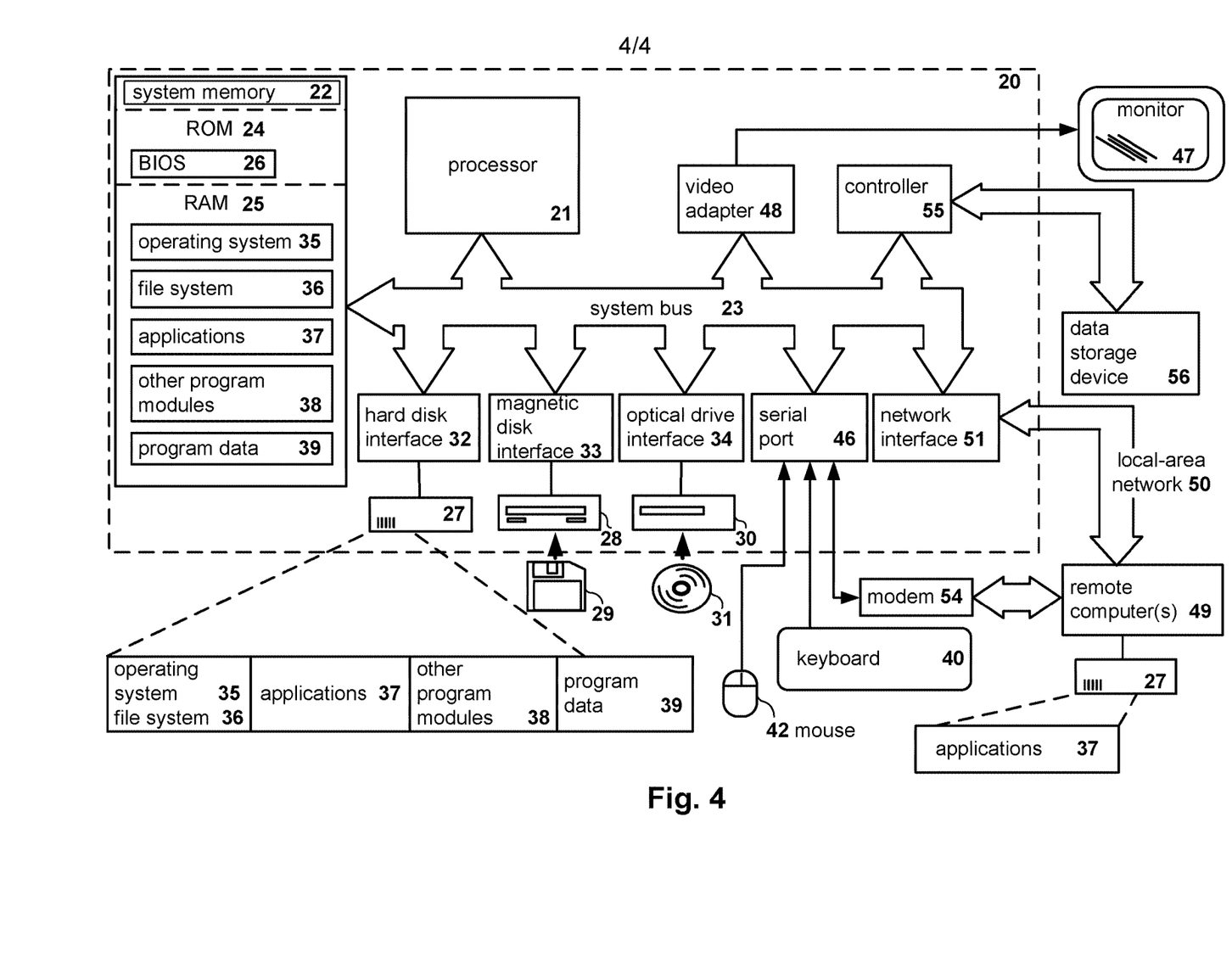
FIG. 4 is a block diagram illustrating a general-purpose computer system on which aspects of systems and methods for scanning web pages may be implemented in accordance with an exemplary aspect.

FIG. 4 is a block diagram illustrating a general-purpose computer system 20 on which aspects of systems and methods for scanning web pages may be implemented in accordance with an exemplary aspect. It should be noted that the computer system 20 can correspond to the physical servers 100, for example, described earlier.

As shown, the computer system 20 (which may be a personal computer or a server) includes a central processing unit 21, a system memory 22, and a system bus 23 connecting the various system components, including the memory associated with the central processing unit 21. As will be appreciated by those of ordinary skill in the art, the system bus 23 may comprise a bus memory or bus memory controller, a peripheral bus, and a local bus that is able to interact with any other bus architecture. The system memory may include permanent memory (ROM) 24 and random-access memory (RAM) 25. The basic input/output system (BIOS) 26 may store the basic procedures for transfer of information between elements of the computer system 20, such as those at the time of loading the operating system with the use of the ROM 24.

The computer system 20, may also comprise a hard disk 27 for reading and writing data, a magnetic disk drive 28 for reading and writing on removable magnetic disks 29, and an optical drive 30 for reading and writing removable optical disks 31, such as CD-ROM, DVD-ROM and other optical media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the computer system 20.

An exemplary aspect comprises a system that uses a hard disk 27, a removable magnetic disk 29 and a removable optical disk 31 connected to the system bus 23 via the controller 55. It will be understood by those of ordinary skill in the art that any type of media 56 that is able to store data in a form readable by a computer (solid state drives, flash memory cards, digital disks, random-access memory (RAM) and so on) may also be utilized.

The computer system 20 has a file system 36, in which the operating system 35, may be stored, as well as additional program applications 37, other program modules 38, and program data 39. A user of the computer system 20 may enter commands and information using keyboard 40, mouse 42, or any other input device known to those of ordinary skill in the art, such as, but not limited to, a microphone, joystick, game controller, scanner, etc. Such input devices typically plug into the computer system 20 through a serial port 46, which in turn is connected to the system bus, but those of ordinary skill in the art will appreciate that input devices may be also be connected in other ways, such as, without limitation, via a parallel port, a game port, or a universal serial bus (USB). A monitor 47 or other type of display device may also be connected to the system bus 23 across an interface, such as a video adapter 48. In addition to the monitor 47, the personal computer may be equipped with other peripheral output devices (not shown), such as loudspeakers, a printer, etc.

Computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes.

Network connections can form a local-area computer network (LAN) 50 and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the computer system 20 may employ a modem 54 or other modules well known to those of ordinary skill in the art that enable communications with a wide-area computer network such as the Internet. The modem 54, which may be an internal or external device, may be connected to the system bus 23 by a serial port 46. It will be appreciated by those of ordinary skill in the art that said network connections are non-limiting examples of numerous well-understood ways of establishing a connection by one computer to another using communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure can be addressed in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a general purpose computer (such as the one described in greater detail in FIG. 3, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed is:

1. A method for detecting a suspicious process in an operating system environment, the method comprising:
   generating, by a hardware processor, a file honeypot in a directory in a file system;
   receiving a directory enumeration request from a process executing in the operating system environment;
   determining whether the process is identified in a list of trusted processes;
   in response to determining that the process is not in the list of trusted processes, providing, to the process by the file system, a file list including the file honeypot responsive to the directory enumeration request;
   intercepting, by a file system filter driver, a file modification request for the file honeypot from the process; and
   identifying the process as a suspicious object responsive to intercepting the file modification request from the process.

2. The method of claim 1, further comprising:
   in response to determining that the process is in the list of trusted processes, providing, to the process by the file system, a file list excluding the file honeypot responsive to the directory enumeration request.

3. The method of claim 1, wherein determining whether the process is identified in the list of trusted processes is based on one or more of a certificate, fingerprint, name, and process identifier.

4. The method of claim 1, wherein generating the file honeypot further comprises at least one of:
   creating a special file corresponding to the file honeypot in the directory; and
   updating the file list to add a filename of the special file at a first position of the file list.

5. The method of claim 1, wherein generating the file honeypot further comprises:
   adding a filename of a nonexistent file to the file list associated with the directory.

6. The method of claim 1, further comprising:
   assigning to the generated file honeypot a filename having at least one steganographic element.

7. The method of claim 1, further comprising:
   modifying a file attribute of the generated file honeypot to indicate a hidden file.

8. The method of claim 1, wherein generating the file honeypot further comprises:
   generating the file honeypot according to a template that specifies a document type and one or more file naming rules comprising at least one steganographic element.

9. The method of claim 1, further comprising:
   responsive to receiving the directory enumeration request, performing a machine learning analysis on a stack trace of the directory enumeration request using machine learning; and
   adding a file honeypot to the provided file list responsive to the directory enumeration request based on the machine learning analysis.

10. A system for detecting a suspicious process in an operating system environment, the system comprising:
    a hardware processor configured to:
    generate a file honeypot in a directory in a file system;
    receive a directory enumeration request from a process executing in the operating system environment;
    determine whether the process is identified in a list of trusted processes;
    in response to determining that the process is not in the list of trusted processes, provide, to the process by the file system, a file list including the file honeypot responsive to the directory enumeration request;

intercept, by a file system filter driver, a file modification request for the file honeypot from the process; and identify the process as a suspicious object responsive to intercepting the file modification request from the process.

11. The system of claim 10, wherein the hardware processor is further configured to:

in response to determining that the process is in the list of trusted processes, provide, to the process by the file system, a file list excluding the file honeypot responsive to the directory enumeration request.

12. The system of claim 10, wherein the hardware processor is further configured to determine whether the process is identified in the list of trusted processes is based on one or more of a certificate, fingerprint, name, and process identifier.

13. The system of claim 10, wherein the hardware processor is further configured to generate the file honeypot further by at least one of:

creating a special file corresponding to the file honeypot in the directory; and updating the file list to add a filename of the special file at a first position of the file list.

14. The system of claim 10, wherein the hardware processor is further configured to generate the file honeypot by:

adding a filename of a nonexistent file to the file list associated with the directory.

15. The system of claim 10, wherein the hardware processor is further configured to:

assign to the generated file honeypot a filename having at least one steganographic element.

16. The system of claim 10, wherein the hardware processor is further configured to:

modify a file attribute of the generated file honeypot to indicate a hidden file.

17. The system of claim 10, wherein the hardware processor is further configured to generate the file honeypot by:

generating the file honeypot according to a template that specifies a document type and one or more file naming rules comprising at least one steganographic element.

18. The system of claim 10, wherein the hardware processor is further configured to:

responsive to receiving the directory enumeration request, perform a machine learning analysis on a stack trace of the directory enumeration request using machine learning; and add a file honeypot to the provided file list responsive to the directory enumeration request based on the machine learning analysis.

19. A non-transitory computer readable medium storing thereon computer executable instructions for detecting a suspicious process in an operating system environment, including instructions for:

generating a file honeypot in a directory in a file system;

receiving a directory enumeration request from a process executing in the operating system environment;

determining whether the process is identified in a list of trusted processes;

in response to determining that the process is not in the list of trusted processes, providing, to the process by the file system, a file list including the file honeypot responsive to the directory enumeration request;

intercepting, by a file system filter driver, a file modification request for the file honeypot from the process; and identifying the process as a suspicious object responsive to intercepting the file modification request from the process.

* * * * *